Patented Sept. 5, 1950

2,520,930

UNITED STATES PATENT OFFICE 2,520,930

ISOSAFROL-FORMALDEHYDE-ALKYL HYDROXY ETHER REACTION PRODUCT AS PYRETHRIN SYNERGIST

Oscar F. Hedenburg, Pittsburgh, Pa., assignor, by mesne assignments, to Rex Research Corporation, Toledo, Ohio, a corporation of Delaware No Drawing. Application September 17, 1947, Serial No. 774,675

4 Claims. (Cl. 167—24)

This invention relates to the production of certain chemical products or organic compounds, and to compositions of the products or compounds with pyrethrins with which they are synergists.

The new products or compounds of my invention are best described at this time as those resulting from certain reacting materials. In a preferred embodiment of my invention I form the compounds by reacting together isosafrole, an alcohol and paraformaldehyde in the presence of a catalyst to depolymerize the paraformaldehyde and aid in the reaction of formaldehyde with the isosafrole and alcohol. The alcohols are the alkoxyethyl alcohols or cellosolves

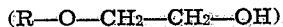

and alkoxyethoxyethyl alcohols or carbitols

where R is an alkyl group having from 1 to 4 carbon atoms.

The compounds may be made by reacting all three of the constituents together, or by first reacting either isosafrole, or the alcohol, with paraformaldehyde and then adding the third constituent. As catalysts, I may use toluenesulphonic acid, naphthalene sulphonic acid, alkylphosphoric acid and the like. The reactions are advantageously carried out in benzene to which the catalyst is added. Water is formed in the early stages of the reaction while the paraformaldehyde is being depolymerized into formaldehyde which reacts with isosafrole and the alcohol yielding water. It is necessary to remove water, advantageously done by refluxing, to hydrolyze the formal and so that the alcohol will be combined.

In some tests the mixture was refluxed until only a very small amount of water remained. In other tests the water was distilled by boiling benzene into a receiver and measuring the contents. In still other tests the reaction mixture was refluxed for a period of time and then water was distilled by boiling benzene into a receiver. After long study and many tests the best results were believed to be obtained by using the proportions of one mol of isosafrole, one mol of alcohol and two mols of formaldehyde. The reaction mixture was refluxed and then one-half a mol of water and the water liberated from the paraformaldehyde was distilled by boiling benzene into a receiver and measuring the contents. The reaction mixture was refluxed further.

When the reaction mixture was refluxed to recombine all water, alcohol was freed or displaced.

When water was boiled out by benzene from the point where paraformaldehyde was depolymerized and dissolved, there was some formal of the alcohol remaining.

It can be seen that the water formed in the reaction came from the reaction between alcohol and formaldehyde which yielded the formal and water. Refluxing was, therefore, necessary to hydrolyze the formal but some of the water, as explained above, was removed so that alcohol would be combined.

Tests were first made using one mol each of isosafrole, alcohol and formaldehyde. It was found, however, that a large part, or nearly one-half, of the isosafrole and alcohol were uncombined and could be recovered by distillation at reduced pressure. The best results were obtained when two mols of formaldehyde were used with one mol each of isosafrole and alcohol.

Tests were made with formaldehyde one mol, two mols and up to three mols, but the insecticidal value of the product was less when more than two mols were used.

The following examples illustrate the preparation of products or compounds of my invention, and the preparation and effectiveness of insecticidal compositions thereof with pyrethrins:

Example 1

This product was made by using 38 g. methoxyethyl alcohol 0.5 mol, 85 g. of isosafrole about 0.5 mol, and 31.1 g. of 96% paraformaldehyde (30 g. formaldehyde value) 1 mol. These materials were put into a flask with 0.5 g. of toluenesulfonic acid and 100 cc. of benzene. The temperature was raised rapidly to 80° C. and kept there for 25 minutes whereupon the paraformaldehyde had dissolved and the reaction mixture was clear. The materials were heated further for about an hour at 80° C. ± 1° C. and then the temperature was raised to reflux benzol at 81.5° C. in the reaction mixture. After about 1½ hrs. the temperature was 82° C.

There was then boiled out and collected in a graduated receiver 5 cc. of water (on evaporation 0.45 g. of paraformaldehyde remained). The temperature rose to 92.2° C. The reaction mixture was now refluxed for 20 hrs. and the temperature rose to 95.2° C. There was now boiled out and collected 0.25 cc. of water.

The benzene solution of the product was washed with sodium bicarbonate solution to wash out acid. The benzene solution was clarified, filtered and distilled at reduced pressure to 98° C. in the water bath to remove benzene. There was obtained 138.5 g. of product, a mobile, light colored oil.

A petroleum distillate solution containing 300 mg. of the product and 30 mg. of pyrethrins per 100 cc. was tested against houseflies in a Peet-Grady chamber. The knockdown in 10 minutes was 95% and the kill after 24 hours was 79%. The O. T. I. gave 100% knockdown and 38% kill.

The O. T. I. means the Official Test Insecticide which contains 100 mg. of pyrethrins per 100 cc. and gives a variable kill according to conditions of from about 35% to about 55%. A solution containing 30 mg. of pyrethrins per 100 cc. gave 25% kill.

*Example 2*

This product was made with 90 g. of isosafrole, 38 g. of methoxyethyl alcohol, 35 g. of 96% paraformaldehyde, 0.5 g. of toluenesulfonic acid and 100 cc. of benzene, by digesting for 6¼ hrs., boiling out 5.5 cc. of water and refluxing for 17 hrs. There was obtained 147.5 g. of product. A petroleum distillate solution containing 300 mg. and 30 mg. of pyrethrins per 100 cc. gave 92% knockdown and 65% kill. The larger amount of isosafrole and of paraformaldehyde contributed to the lower value of kill.

*Example 3*

This product was made with 90 g. of isosafrole, 38 g. of methoxyethyl alcohol and 31.1 g. of 96% paraformaldehyde. These materials were put in a flask with 0.5 g. of toluenesulfonic acid and 100 cc. of benzene. There was obtained 144 g. of product. A petroleum distillate solution containing 300 mg. and 30 mg. of pyrethrins gave 91% knockdown and 70% kill. This product of intermediate value using more isosafrole than Example 1.

*Example 4*

This product was made from 45 g. of ethoxyethyl alcohol, 85 g. of isosafrole and 31.1 g. of 96% paraformaldehyde (yielding to 30 g. of formaldehyde). These materials were put into a flask with 0.5 g. toluenesulfonic acid and 100 cc. of benzene. The temperature was raised rapidly to 80 C. and in 20 minutes heating at 80° C. the paraformaldehyde had been dissolved. The temperature was raised slowly to 83.5° C. during 30 minutes, and after 1 hour and 25 minutes the temperature was 83.8° C. There was then boiled out and measured 5 cc. of water (which on evaporation yielded 0.4 g. of paraformaldehyde). The reaction mixture was refluxed for 19 hrs. during which the temperature rose from 92° C. to 98° C. Then 0.3 cc. of water was boiled out.

The benzene solution was washed free from acid with sodium bicarbonate solution. The benzene solution was clarified, filtered, and distilled at reduced pressure to yield at constant weight 144 g. of product.

A petroleum distillate solution containing 300 mg. and 30 mg. of pyrethrins per 100 cc. gave 97% knockdown and 85% kill of house flies. The O. T. I. gave 96% knockdown and 58% kill.

*Example 5*

This product was made from 59 g. of butoxyethyl alcohol, 85 g. of isosafrole and 31.1 g. of 96% paraformaldehyde. These materials were put into a flask with 0.5 g. toluenesulfonic acid and 100 cc. of benzene. The temperature was raised rapidly to 80° C. and kept there for 26 minutes whereupon the paraformaldehyde had been dissolved. Then the temperature was raised during 30 minutes to 86.4° C. There was a small pool of water at the bottom of the reaction mixture in the flask. There was boiled out 5 cc. of water (on evaporation there remained 0.7 g. of paraformaldehyde). The reaction mixture was then refluxed for 21 hrs. during which time the temperature rose from 91° C. to 98° C. Then 0.4 cc. of water was boiled out. The benzene solution was washed free from acid, clarified, filtered and distilled to remove benzene. The product weighed 162 g. A petroleum distillate solution containing 300 mg. and 30 mg. of pyrethrins per 100 cc. gave 98% knockdown and 88% kill. The O. T. I. gave 47% kill.

*Example 6*

This product was made from 59 g. of butoxyethyl alcohol, 90 g. of isosafrole and 31.1 g. of 96% paraformaldehyde. These materials, 0.5 g. of toluenesulfonic acid and 100 cc. of benzene were reacted for 2 hrs. (the temperature in the reaction mixture rose to 87° C.). Then 5 cc. of water was boiled out and the reaction mixture was refluxed for 21½ hrs. The product weighing 168.5 g. was recovered in the same manner as described in Example 5. A petroleum distillate solution containing 300 mg. and 30 mg. of pyrethrins gave 96% knockdown and 81% kill. The O. T. I. gave 41% kill.

*Example 7*

This product was made from 59 g. of butoxyethyl alcohol, 81 g. of isosafrole and 40 g. of paraformaldehyde. These materials with 0.5 g. of toluenesulfonic acid and 100 cc. of benzene were heated during 8 hrs. while the temperature rose from 60° C. to 86° C. The paraformaldehyde had been dissolved after about 45 minutes heating to 84° C. Water was boiled out and 7.2 cc. was collected (on evaporation 1.3 g. of paraformaldehyde was recovered). The benzene solution was handled as in Example 5 and 167 g. of product was obtained.

A petroleum distillate solution containing 300 mg. and 30 mg. of pyrethrins per 100 cc. gave 93% knockdown and 77.6% kill. The O. T. I. gave 51% kill.

*Example 8*

This product was made from 60 g. of methoxyethoxyethyl alcohol, 85 g. of isosafrole and 31.1 g. of 96% paraformaldehyde. These materials with 0.5 g. of toluenesulfonic acid and 100 cc. of benzene were heated at 80° C. for 25 minutes to dissolve the paraformaldehyde and then the temperature was raised during 1½ hrs. to 85° C. There was boiled out 5 cc. of water (on evaporation 0.4 g. of paraformaldehyde remained). The reaction mixture was refluxed for 20 hrs. during which time the temperature rose from 92.8° C. to 97° C. Then 0.4 cc. of water was boiled out. The benzene solution was handled as in Example 5. The product weighed 162 g. A petroleum distillate solution containing 300 mg. and 30 mg. of pyrethrins per 100 cc. gave 99% knockdown of flies and 89% kill. The O. T. I. gave 49% kill.

*Example 9*

This product was made from 60 g. of methoxyethoxyethyl alcohol, 90 g. of isosafrole and 31.1 g. of 96% paraformaldehyde. These materials, 0.5 g. of toluenesulfonic acid and 100 cc. of benzene were heated at 80° C. for 25 minutes during which time the paraformaldehyde was dissolved. Then the temperature was raised during 1½ hrs. to 85.2° C. There was boiled out 5 cc. of water (yielding 0.4 g. paraformaldehyde on evaporation). The reaction mixture was refluxed for 21 hrs. during which time the temperature rose from 92.5° C. to 97° C. Then 0.4 cc. of water was boiled out. The benzene solution was handled as in Example 5. The product weighed 166 g. A petroleum distillate solution containing 300 mg. and 30 mg. of pyrethrins per 100 cc. gave 95% knockdown and 79% kill of flies. The O. T. I. gave 53% kill.

*Example 10*

This product was made from 60 g. of methoxyethoxyethyl alcohol, 81 g. of isosafrole and 40 g. of 96% paraformaldehyde. These materials, 0.5 g. of toluenesulfonic acid and 100 cc. of benzene were heated about 1 hour gradually increasing the temperature to 83° C. to dissolve the paraformaldehyde. Heating was continued for 11 hours more to 84.8° C. There was boiled out 7.2 cc. (which on evaporation yielded 1.3 g. of paraformaldehyde). The product weighed 169.5 g. A petroleum distillate solution containing 300 mg. and 30 mg. of pyrethrins per 100 cc. gave 90% knockdown and 64% kill. The O. T. I. gave 51% kill.

*Example 11*

This product was made from 67 g. of ethoxyethoxyethyl alcohol, 81 g. of isosafrole and 40 g. of 96% paraformaldehyde. These materials, 0.5 g. of toluenesulfonic acid and 100 cc. of benzene were heated together for 3 hrs. with temperature rising from 60° C. to 85° C. During the last 1⅙ hrs. the reaction mixture was refluxing. There was boiled off and collected 6.8 cc. of aqueous distillate which on evaporation yielded 1.3 g. of paraformaldehyde. The benzene solution was handled as in Example 5. The product weighed 176.5 g. A petroleum distillate solution containing 300 mg. and 30 mg. of pyrethrins gave 92.4% knockdown and 75% kill. The O. T. I. gave 51% kill.

*Example 12*

This product was made from 81 g. of butoxyethoxyethyl alcohol, 85 g. of isosafrole and 31.1 g. of 96% paraformaldehyde. These materials, 0.5 g. of toluenesulfonic acid and 100 cc. of benzene were heated at 80-81° C. for 45 minutes whereupon the paraformaldehyde was dissolved. The reaction mixture was heated for 1⅛ hrs. during which time the temperature in the mixture rose to 86° C. There was a small pool of water at the bottom of the flask. There was boiled out 5 cc. of water (which on evaporation yielded 0.65 g. of paraformaldehyde). The reaction mixture was refluxed for 20 hrs. and the temperature rose from 93° C. to 99° C.

The benzene solution was washed free from acid, clarified, filtered and distilled at reduced pressure to remove benzene. The product weighed 190 g. A petroleum distillate solution containing 300 mg. and 30 mg. of pyrethrins per 100 cc. gave 97% knockdown and 74% kill of flies. The O. T. I. gave 49% kill.

*Example 13*

This product was made from 81 g. of butoxyethoxyethyl alcohol, 90 g. of isosafrole and 31.1 g. of 96% paraformaldehyde. The butoxyethoxyethyl alcohol, paraformaldehyde, 0.5 g. of toluenesulfonic acid and 50 cc. of benzene were heated for 2 hours with the temperature rising slowly from 60° C. to 80° C. in 23 minutes and then at 80° C. for the rest of two hours. The paraformaldehyde was dissolved. There was then added the isosafrole and 50 cc. of benzene and the reaction mixture was heated for 3½ hrs. with the temperature rising from 80° C. to 84° C. There was boiled out 5 cc. of water which yielded 0.27 g. of paraformaldehyde on evaporation. The benzene solution was now refluxed for 24 hrs. during which time the temperature rose from 95.5° C. to 99.5° C. The benzene solution was handled as in Example 5. The product weighed 194 g. A petroleum distillate solution containing 300 mg. and 30 mg. of pyrethrins per 100 cc. gave 97% knockdown and 82% kill of flies. The O. T. I. gave 39% kill.

*Example 14*

This product was made from 81 g. of butoxyethoxyethyl alcohol, 90 g. of isosafrole and 31.1 g. of 96% paraformaldehyde. These materials, 0.5 g. toluenesulfonic acid and 100 cc. of benzene were heated about two hrs. at 80° C. to dissolve the paraformaldehyde. The temperature was raised to boil out water. Water began to collect when the temperature in the boiling reaction mixture was 85.2° C. After continuous boiling for 7 hrs., there was collected 8 cc. of aqueous solution which gave on evaporation 1.5 g. of paraformaldehyde. There was, therefore, about 6.5 cc. water in the 8 cc. The temperature rose to 100° C. There was some solid paraformaldehyde in the condenser and receiver. The benzene solution was handled as in Example 5. The product weighed 192 g. A petroleum distillate solution containing 300 mg. and 30 mg. of pyrethrins per 100 cc. gave 98% knockdown and 94% kill of flies. The O. T. I. gave 60% kill.

*Example 15*

This product was made from 81 g. of butoxyethoxyethyl alcohol, 81 g. of isosafrole and 46.6 g. of 96% paraformaldehyde. These materials, 0.5 g. of toluenesulfonic acid and 100 cc. of benzene were heated about 1 hour while the temperature rose slowly from 60° C. to 80° C. when most of the paraformaldehyde had been dissolved. The temperature was raised slowly to 84° C. during about 1½ hrs. when the paraformaldehyde was dissolved. The heating was continued for 34½ hrs. more while the temperature rose to 86.3° C. There was boiled out 7 cc. of aqueous solution which yielded 2.5 g. of paraformaldehyde on evaporation. The benzene solution was filtered and distilled to remove benzene. There was obtained 194 g. of product. A petroleum distillate solution containing 300 mg. and 30 mg. of pyrethrins per 100 cc. gave 99% knockdown and 62% kill of flies. The O. T. I. gave 50% kill.

*Example 16*

This product was made from 81 g. of butoxyethoxyethyl alcohol, 81 g. of isosafrole and 40 g. of 96% paraformaldehyde. These materials, 0.5 g. of toluenesulfonic acid and 100 cc. of benzene were heated together for about 1⅔ hrs. while the temperature rose from 60° C. to 84° C. when the paraformaldehyde was dissolved. The temperature was raised and water was boiled out during about 7 hrs. while the temperature rose to 99° C. and 7.7 cc. of aqueous solution was collected which on evaporation yielded 1 g. of paraformaldehyde. The benzene solution was washed free from acid, clarified, filtered and distilled to remove benzene. The product weighed 189 g. A petroleum distillate solution containing 300 mg. and 30 mg. of pyrethins per 100 cc. gave 100% knockdown and 87.5% kill of flies. The O. T. I. gave 43% kill.

*Example 17*

This product was made from 81 g. of butoxyethoxyethyl alcohol, 81 g. of isosafrole and 16 g. of 96% paraformaldehyde. These materials, 0.6 g. of naphthalenesulfonic acid and 100 cc. of benzene were heated from 60° C. to 85° C. during about 20 minutes when the paraformaldehyde was dissolved. The benzene solution was refluxed for 14 hrs. when the temperature had risen to 94.8° C. There was boiled off 1 cc. of water containing no formaldehyde. The benzene solution was washed free from acid, clarified, filtered and distilled at reduced pressure to remove benzene. The product weighed 171.5 g. A petroleum distillate solution containing 300 mg. and 30 mg. of pyrethrins per 100 cc. gave 95% knockdown and 75% kill of flies. The O. T. I. gave 51% kill.

Early tests were made using one mol each of the alcohol, isosafrole and formaldehyde. It was found as shown below that only about one-half of the alcohol and isosafrole reacted so that the reaction was substantially one mol each of alcohol and isosafrole and two mols of formaldehyde.

*Example 18*

This product was made as follows: 85 g. of butoxyethoxyethyl alcohol and 16 g. of 96% paraformaldehyde were heated with 0.5 g. of toluenesulfonic acid and 10 cc. of benzene for 25 minutes at 55°–62° C. when the paraformaldehyde was dissolved. There was then added 81 g. of isosafrole and 40 cc. of benzene. The temperature fell to 50° C. Heating was continued for about an hour at 57° to 74° C. whereupon 100 cc. of benzene was added and the temperature was raised to boiling (84.5° C.) to collect water, of which 7.5 cc. was collected during 9½ hrs. On evaporation the 7.5 cc. yielded 1 g. of paraformaldehyde. The benzene solution of the product was washed free from acid, clarified, filtered and distilled to remove benzene. The product weighed 169 g. If the sum of the weights used of butoxyethoxyethyl alcohol, isosafrole and paraformaldehyde be taken and from it the weight of water recovered be subtracted, the answer is 174.5 g. which is to be compared with 169 g.

The product of 169 g. was distilled at reduced pressure in an oil bath heated gradually up to 245° C. The distillate came over up to 166° C. There was obtained 98 g. of undistilled product and 71 g. of distillate which was redistilled into two crude fractions showing that butoxyethoxyethyl alcohol and isosafrole were present in the distillate, together with 6 g. of high boiling residue. If one-fourth mol each of butoxyethoxyethyl alcohol, 40.5 g., and isosafrole, 40.5 g., react with one-half mol of formaldehyde, 15 g., the theoretical yield is 96 g. which compares with 98 g. actually obtained.

A petroleum distillate solution containing 300 mg. (from the 98 g. lot) and 30 mg. of pyrethrins gave 98% knockdown and 84% kill of flies. The O. T. I. gave 47% kill.

*Example 19*

This composition was made by heating together for about 25 minutes 85 g. of butoxyethoxyethyl alcohol, 15.6 g. of 96% paraformaldehyde, 0.5 g. of toluenesulfonic acid and 10 cc. of benzene until the paraformaldehyde was nearly dissolved. Then there was added 81 g. of isosafrole and 140 cc. of benzene. The temperature was raised to 57° C. and one-half hour later to 65° C. The temperature was then raised to boiling and collection of water. During 8 hrs. there was collected 8.7 cc. of water as the temperature rose from 83° C. to 94.2° C. The benzene solution was washed free from acid with water, clarified, filtered and distilled at reduced pressure to remove benzene. There was obtained 173 g. of product which was steam distilled for 1 hr. with recovery of 163 g. A petroleum distillate solution containing 300 mg. and 30 mg. of pyrethrins per 100 cc. gave 92% knockdown and 77% kill of flies. The O. T. I. gave 42% kill.

I claim:

1. Method for the preparation of an organic chemical product which comprises reacting one mol of isosafrol, substantially one mol of at least one alcohol selected from the group consisting of R—O—CH$_2$—CH$_2$—OH and

R—O—CH$_2$—CH$_2$—O—CH$_2$—CH$_2$—OH in which R is an alkyl group having from one to four carbon atoms, and substantially two mols of formaldehyde with removal of about one-half mol of water from the reaction mixture, the reaction mixture containing as a catalyst a strong, non-volatile acid.

2. The organic chemical product resulting from reacting together one mol of isosafrol, substantially one mol of at least one alcohol selected from the group consisting of

R—O—CH$_2$—CH$_2$—OH and

R—O—CH$_2$—CH$_2$—O—CH$_2$—CH$_2$—OH in which R is an alkyl group having from one to four carbon atoms, and substantially two mols of formaldehyde with removal of about one-half mol of water from the reaction mixture, the reaction mixture containing as a catalyst a strong, non-volatile acid.

3. An insecticidal composition comprising pyrethrins and as a synergist therefor the product of claim 2.

4. An insecticidal composition comprising the composition of claim 3 dissolved in a petroleum distillate.

OSCAR F. HEDENBURG.

REFERENCES CITED

The following references are of record in the file of this patent:

UNITED STATES PATENTS

| Number | Name | Date |
|---|---|---|
| 2,345,573 | Bruson | Apr. 4, 1944 |
| 2,390,511 | Chester | Dec. 11, 1945 |
| 2,411,720 | Gertler | Nov. 26, 1946 |
| 2,421,569 | La Forge | June 3, 1947 |
| 2,421,570 | La Forge | June 3, 1947 |
| 2,431,844 | Synerholm | Dec. 2, 1947 |
| 2,431,845 | Synerholm | Dec. 2, 1947 |
| 2,433,491 | Synerholm | Dec. 30, 1947 |

OTHER REFERENCES

Chemical Abstracts, vol. 13, page 3155 (1919).
Synerholm et al., Contributions from Boyce Thompson Inst., pages 79–89 (Oct. 1945), vol. 14.
Synerholm et al. ibid., pages 433–442 (Jan. 1945, vol. 13).